United States Patent
Dey et al.

(10) Patent No.: US 11,010,904 B2
(45) Date of Patent: May 18, 2021

(54) COGNITIVE STATE ANALYSIS BASED ON A DIFFICULTY OF WORKING ON A DOCUMENT

(71) Applicant: International Business Machines Corporation, Armonk, NY (US)

(72) Inventors: Kuntal Dey, New Delhi (IN); Seema Nagar, Bangalore (IN); Sudhanshu Singh, New Delhi (IN); Roman Vaculin, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 16/286,913

(22) Filed: Feb. 27, 2019

(65) Prior Publication Data

US 2019/0197698 A1    Jun. 27, 2019

Related U.S. Application Data

(63) Continuation of application No. 15/180,272, filed on Jun. 13, 2016, now Pat. No. 10,339,659.

(51) Int. Cl.
*G06K 9/00* (2006.01)
*G06T 7/20* (2017.01)

(52) U.S. Cl.
CPC .............. *G06T 7/20* (2013.01); *G06K 9/0061* (2013.01); *G06K 9/00335* (2013.01)

(58) Field of Classification Search
CPC ..... G06T 7/20; G06K 9/00335; G06K 9/0061
See application file for complete search history.

(56) References Cited

U.S. PATENT DOCUMENTS

| | | | | |
|---|---|---|---|---|
| 5,305,238 A | * | 4/1994 | Starr, III | G06F 3/021 400/704 |
| 6,241,686 B1 | * | 6/2001 | Balkin | G16H 50/50 600/544 |
| 6,419,629 B1 | * | 7/2002 | Balkin | A61B 5/4809 600/300 |
| 7,481,779 B2 | * | 1/2009 | Large | A61B 5/103 128/898 |

(Continued)

OTHER PUBLICATIONS

Classification and Categorization in computer reading and analysis of texts, Jean Guy Meunier et al., ResearchGate, Jan. 2005, pp. 1-30 (Year: 2005).*

(Continued)

*Primary Examiner* — Jayesh A Patel
(74) *Attorney, Agent, or Firm* — Anthony Curro, Esq.; McGinn I.P. Law Group, PLLC

(57) ABSTRACT

A break recommendation method, system, and non-transitory computer readable medium, include detecting a deviation between a current cognitive state of the user and a past cognitive state of the user during a predetermined amount of time for a document type based on a change in an eye gaze movement and a facial and emotional expression and recommending that the user takes a break from viewing the document for a predetermined amount of time based on the deviation being greater than a predetermined threshold value, where the deviation is related to the user viewing the document and the document type of the document.

7 Claims, 6 Drawing Sheets

(56) References Cited

U.S. PATENT DOCUMENTS

| | | | | |
|---|---|---|---|---|
| 7,741,957 | B2* | 6/2010 | Wang | G08B 21/24 |
| | | | | 340/309.7 |
| 8,136,944 | B2* | 3/2012 | De Lemos | A61B 5/163 |
| | | | | 351/209 |
| 8,954,423 | B2* | 2/2015 | Chica | G06F 40/20 |
| | | | | 707/723 |
| 9,239,956 | B2* | 1/2016 | Hein | G06K 9/00597 |
| 9,424,411 | B2* | 8/2016 | McCloskey | G06F 21/32 |
| 9,652,676 | B1* | 5/2017 | Dey | H04N 21/4223 |
| 9,808,156 | B2* | 11/2017 | Horseman | A61B 5/0537 |
| 10,339,659 | B2* | 7/2019 | Dey | G06K 9/00335 |
| 2003/0038754 | A1* | 2/2003 | Goldstein | G06F 3/013 |
| | | | | 345/7 |
| 2007/0066916 | A1* | 3/2007 | Lemos | A61B 5/165 |
| | | | | 600/558 |
| 2011/0213269 | A1* | 9/2011 | Harada | A61B 5/161 |
| | | | | 600/558 |
| 2012/0257035 | A1* | 10/2012 | Larsen | G06F 3/017 |
| | | | | 348/78 |
| 2013/0121591 | A1* | 5/2013 | Hill | G10L 15/1815 |
| | | | | 382/195 |
| 2015/0164418 | A1* | 6/2015 | Johnson | A61B 5/4884 |
| | | | | 434/236 |
| 2015/0213634 | A1* | 7/2015 | Karmarkar | A61B 5/163 |
| | | | | 345/589 |
| 2015/0326570 | A1* | 11/2015 | Publicover | G06F 3/017 |
| | | | | 726/4 |
| 2016/0232155 | A1* | 8/2016 | Allen | G06Q 10/06316 |
| 2016/0334121 | A1* | 11/2016 | Oobayashi | F24F 11/77 |
| 2016/0343229 | A1* | 11/2016 | Hutchinson | G06K 9/0061 |
| 2017/0193449 | A1* | 7/2017 | Baudet | G06F 16/248 |
| 2017/0255766 | A1* | 9/2017 | Kaehler | G06F 21/32 |
| 2017/0278172 | A1* | 9/2017 | Dey | G06Q 30/0633 |

OTHER PUBLICATIONS

108Actiivity recognition—self, Kai Kunze et al., Invisible Computing, Oct. 2015, pp. 105-108 (Year: 2015).*

Looking while Unhappy, Derek M Isaacowitz et al., Psychological science, 2008, pp. 848-853 (Year: 2008).*

Classification and Categorization in computer reading and analysis of texts, Jean Guy Meunier et al, RearchGate, Jan. 2005, pp. 1-30 (Year: 2005).*

Effects of online Reading on popular science comprehension, Monica Macedo-Rouet, Researchgate, Dec. 2003, pp. 99-128 (Year: 2003).*

Actiivity recognition—self, Kai Kunze etal., Invisible Computing, Oct. 2015, pp. 105-108 (Year: 2015).*

United States Office Action dated Feb. 12, 2019 in U.S. Appl. No. 15/180,272.

United States Office Action dated Jan. 15, 2019 in U.S. Appl. No. 15/180,272.

United States Office Action dated Sep. 25, 2019 in U.S. Appl. No. 15/180,272.

United States Office Action dated Jun. 12, 2019 in U.S. Appl. No, 15/180,272.

United States Office Action dated Feb. 28, 2018 in U.S. Appl. No. 15/180,272.

Derek M. Isaacowitz, et al. "Looking while Unhappy", Psychological Science, 2008, pp. 848-853 (Year: 2008).

* cited by examiner

BREAK RECOMMENDATION METHOD 200

COGNITIVE STATE ANALYSIS BASED ON A DIFFICULTY OF WORKING ON A DOCUMENT

CROSS-REFERENCE TO RELATED APPLICATIONS

The present application is a Continuation Application of U.S. patent application Ser. No. 15/180,272, filed on Jun. 13, 2016, the entire contents of which are hereby incorporated by reference.

BACKGROUND

The present invention relates generally to a break recommendation system, and more particularly, but not by way of limitation, to a break recommendation system for improving workforce performance by way of recommending a break or vacation for a user based on a deviation of a measurement of the user's eye gaze, emotional expression, and facial expression recorded while working on a document from a measurement for a similar document.

Conventionally, workforce performance optimization techniques have considered selecting and onboarding employees, studying and optimizing employees' daily performances, improving employees longevity in organizations and minimizing employee churn risks by, for example, human resources analyzing the employees' hours versus the employees' performance. In other words, conventional techniques attempt to assess a cognitive state of the user.

In an unrelated art to workforce performance, cognitive tools such as eye gaze movement and facial/emotional state detection and tracking have been increasingly utilized.

However, there is a technical problem in the conventional techniques in that the conventional techniques are incapable of adaptively monitoring a cognitive state of the user.

SUMMARY

In view of the technical problem, the inventors have considered a non-abstract improvement to a computer technology via a technical solution to the technical problem in which a system can recommend short or long breaks from work to employees by measuring and/or monitoring on a continuous/frequent basis a cognitive state of employees working on computers, mobiles, digital devices, or the like, with cameras, while they work on their devices, using eye gaze tracking and facial/emotional expression tracking, and suggest that the employee take short breaks (e.g., a few minutes every hour) and/or long holidays/vacation (e.g., a few days every year) in the event of significant-enough fall of eye gaze movement smoothness and/or facial/emotional ease from the usual.

In an exemplary embodiment, the present invention can provide a break recommendation system, including a cognitive state tracking circuit configured to track a cognitive state of a user viewing a document, a document identification and difficulty measuring circuit configured to identify a document type, a deviation detecting circuit configured to detect a deviation between a current cognitive state of the user and a past cognitive state of the user during a predetermined amount of time for the document type; and a recommending circuit configured to recommend that the user stop viewing the document for a predetermined amount of time based on the deviation being greater than a predetermined threshold value.

Further, in another exemplary embodiment, the present invention can provide a break recommendation method, including tracking a cognitive state of a user viewing a document, identifying a document type of the document, detecting a deviation between a current cognitive state of the user and a past cognitive state of the user during a predetermined amount of time for the document type, and recommending that the user stop working on the document for a predetermined amount of time based on the deviation being greater than a predetermined threshold value.

Even further, in another exemplary embodiment, the present invention can provide a non-transitory computer-readable recording medium recording a break recommendation program, the program causing a computer to perform: tracking a cognitive state of a user viewing a document, identifying a document type of the document, detecting a deviation between a current cognitive state of the user and a past cognitive state of the user during a predetermined amount of time, and recommending that the user stop viewing the document for a predetermined amount of time based on the deviation being greater than a predetermined threshold value.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
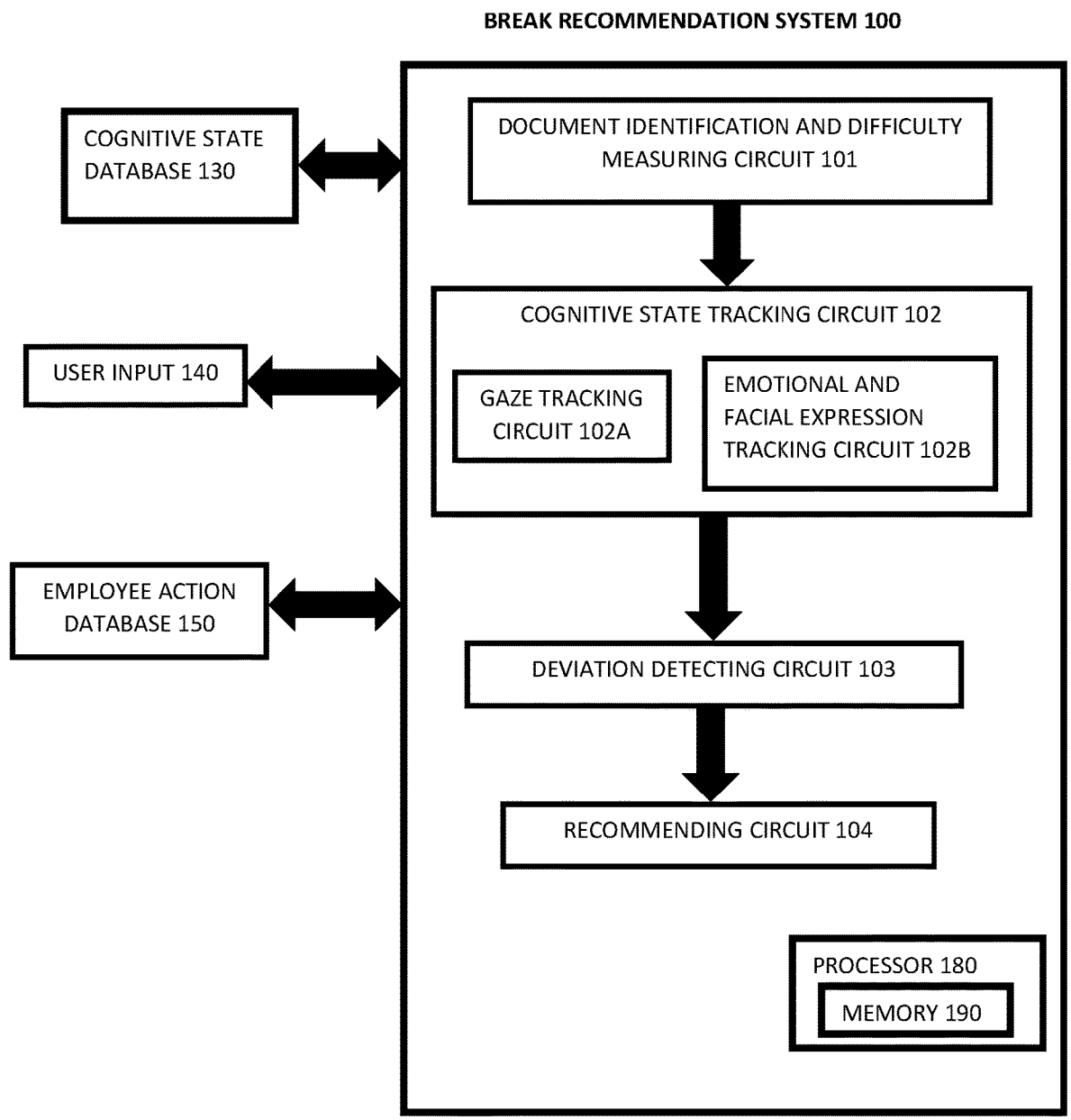
FIG. 1 exemplarily shows a block diagram illustrating a configuration of a break recommendation system 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the break recommendation system 100 includes a document identification and difficulty measuring circuit 101, a cognitive state tracking circuit, 102, a deviation detection circuit 103, and a recommending circuit 104. The break recommendation system 100 includes a processor 180 and a memory 190, with the memory 190 storing instructions to cause the processor 180 to execute each circuit of break recommendation system 100. The processor and memory may be physical hardware components, or a combination of hardware and software components.

Although the break recommendation system 100 includes various circuits, it should be noted that the break recommendation system can include modules in which the memory 190 stores instructions to cause the processor 180 to execute each module of break recommendation system 100.

Also, each circuit can be a stand-alone device, unit, module, etc. that can be interconnected to cooperatively produce a transformation to a result.

With the use of these various circuits, the break recommendation system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 4:
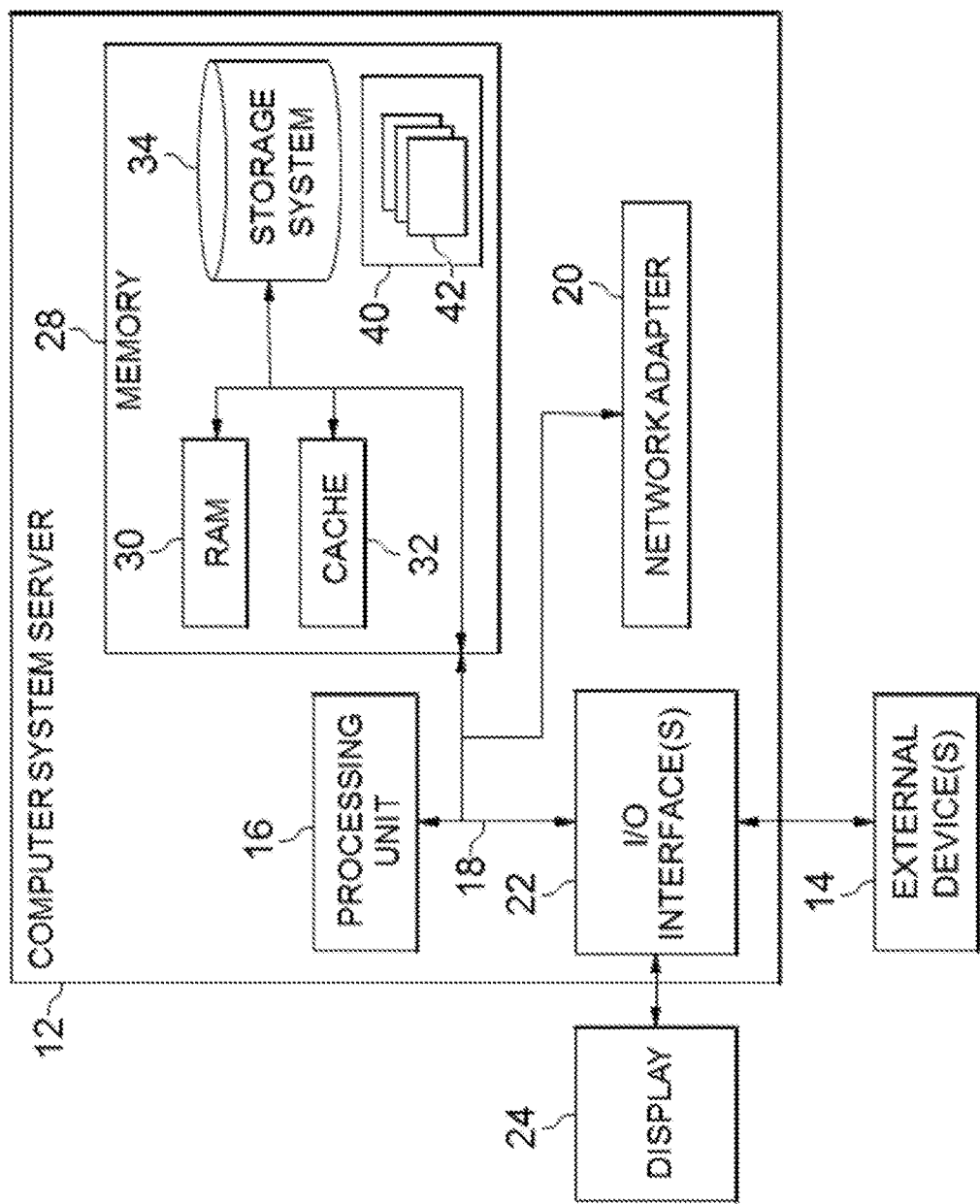
FIG. 4 depicts a cloud computing node 10 according to an exemplary embodiment of the present invention.
Figure 5:
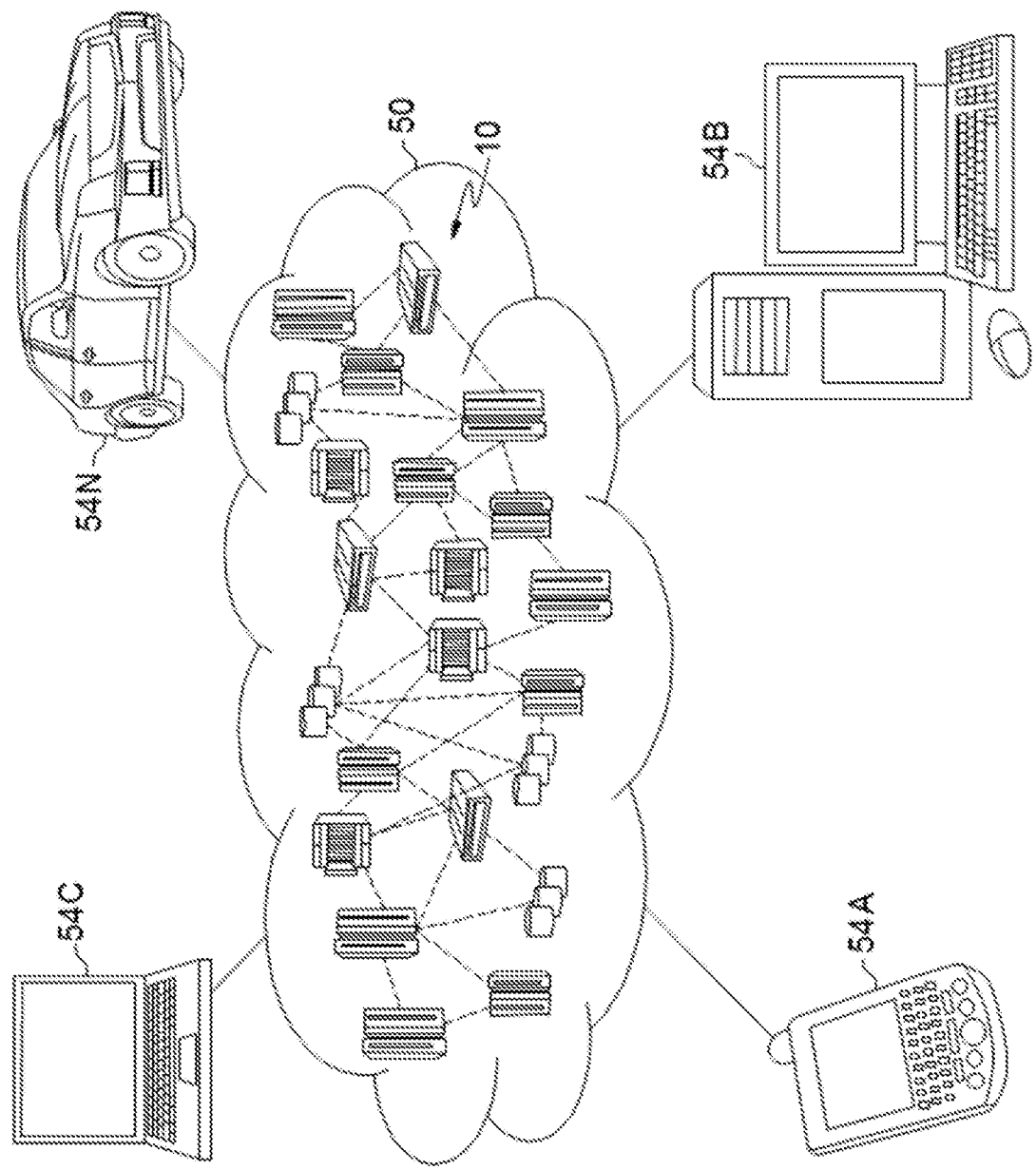
FIG. 5 depicts a cloud computing environment 50 according to another exemplary embodiment of the present invention.
Figure 6:
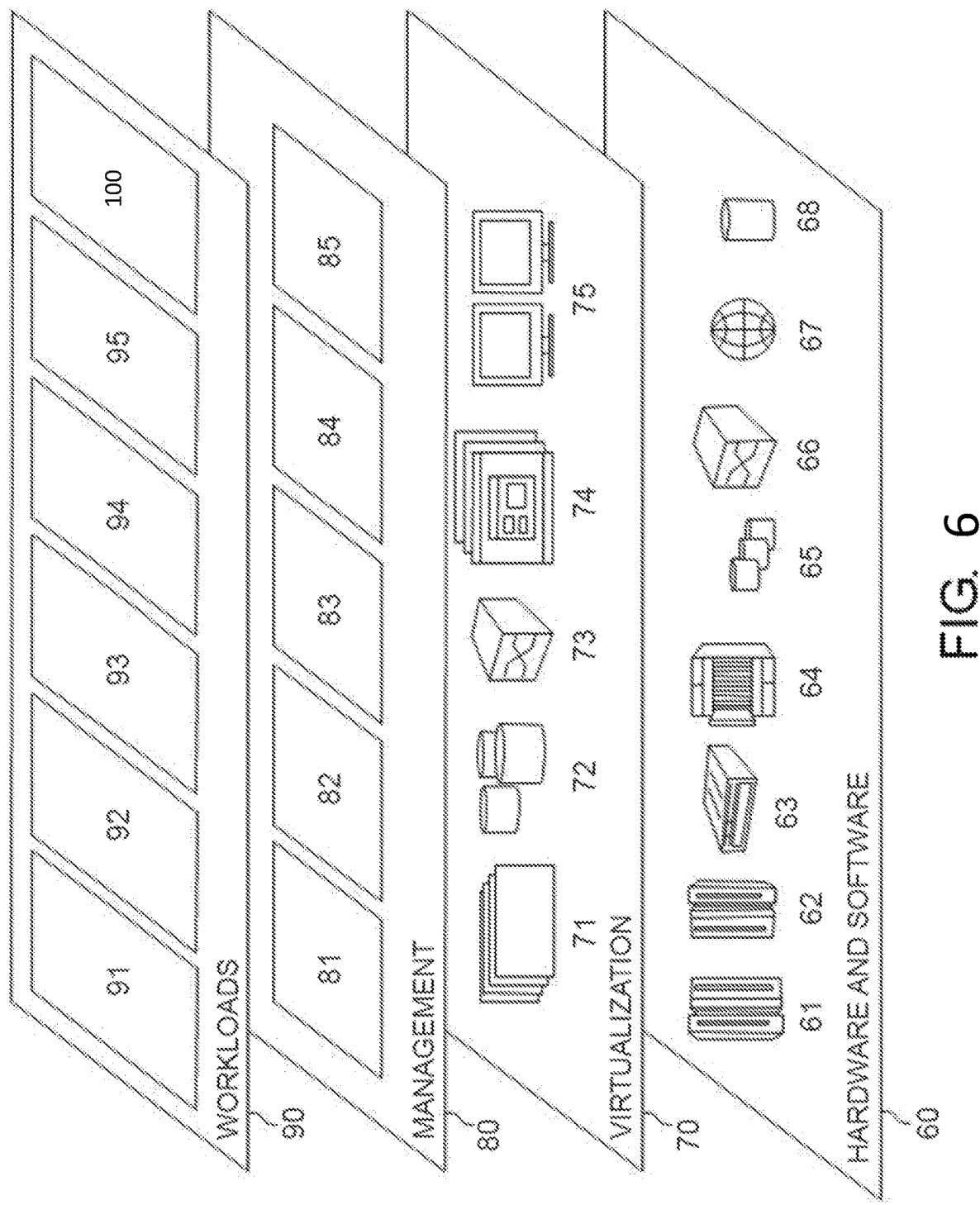
FIG. 6 depicts abstraction model layers according to an exemplary embodiment of the present invention.

Although as shown in FIGS. 4-6 and as described later, the computer system/server 12 is exemplarily shown in cloud computing node 10 as a general-purpose computing circuit which may execute in a layer the break recommendation system 100 (FIG. 6), it is noted that the present invention can be implemented outside of the cloud environment.

Turning back to FIG. 1 and the break recommendation system 100, the document identification and difficulty measuring circuit 101 identifies a document type (e.g., text document, software program written using a programming language, etc.) and for each page within the document, measures the conceptual difficulty (i.e., document difficulty) of the page. The document difficulty of a text document can be objectively measured with, for example, Natural Language Processing (NLP) properties such as text readability, semantic difficulty, presence of sarcasm and so on. For other document types (e.g., non-textual such as software-based or programming), a difficulty level is set from either prior policies or external tools/techniques.

For example, the subject difficulty of the document can be measured using a Flesch readability score which uses the sentence length (e.g., number of words per sentence) and the number of syllables per word with an equation to calculate the reading ease. Texts with a very high Flesch reading Ease score (e.g., about 100) are very easy to read, have short sentences, and no words of more than two syllables. That is, each employee could be required to take a test adapted to be similar to a Flesch-Kincaid grade level test which scores the employees readability based on other employees to objectively rank the document difficulty for a particular employee.

Even further, a manager (supervisor) can set a document difficulty to be the same for all employees. Or, a manager (supervisor) can set an expected document difficulty for each page of a document. In this manner, the document difficulty is an objectively measured variable that can be measured or set for each page of each document.

The cognitive state tracking circuit 102 tracks a cognitive state of the employee (e.g., a user) as the employee is working on (i.e., viewing) the document. For example, the cognitive state tracking circuit 102 includes a gaze tracking circuit 102A and an emotional and facial expression tracking circuit 102B.

The eye tracking circuit 102A tracks the employee's eye gaze movement over time, as the employee works with the document on the digital device. That is, the eye tracking circuit 102A monitors the eye gaze movement of an employee as they read document(s) of various types. Also, the eye tracking circuit 102A learns an eye gaze profile of a given employee with respect to a given document type and objective difficulty level of the document, for short time window slots (such as 10-minute slots) and longer time window slots (such as 5-day slots) to store in the cognitive state database 130 to be compared to as described later. For example, the eye tracking circuit 102A can measure the employee's cognitive state by tracking, for example, eye movement smoothness measured in terms of average fixations, rate and average length of regressions, etc.

The emotional and facial expression tracking circuit 102B monitors a facial/emotional expression of an employee as they read document(s) of various types. Also, the emotional and facial expression tracking circuit 102B learns emotional/facial ease profile of a given employee with respect to a given document type and objective difficulty level of the document, for short time window slots (such as ten-minute slots) and longer time window slots (such as five-day slots) to store in the cognitive state database 130 to be compared to as described later. For example, the emotional and facial expression tracking circuit 102B can measure a cognitive state of the employee based on the employee facial expressions indicating attentiveness to the document, the employee yawning indicating fatigue, or the like.

The gaze tracking circuit 102A and the emotional and facial expression tracking circuit 102B track the cognitive state of the employee in real-time as well as store the tracked cognitive state over periods of times for a given document (i.e., according to the document and difficulty of the document) in the cognitive state database 130.

That is, the cognitive state database 130 includes learned data for the employee's usual eye gaze smoothness and facial/emotional ease when the employee is working on documents, and benchmarks that with respect to the difficulty of text. The learned data is bootstrapped over a predetermined period of time (i.e., potentially in a supervised setting, but extensible to an unsupervised model also) for different sliding window sizes (i.e., short windows such as ten-minute windows with a one-minute slide and longer windows such as five-day window with a one-day slide. Accordingly, the cognitive state database 130 includes cognitive state profiles created for each employee for eye gaze smoothness and facial/emotional ease with respect to document type and difficulty level for the deviation detecting circuit 103 to compare the current cognitive state to the profile.

The deviation detecting circuit 103 compares a current cognitive state of the employee as measured by the cognitive state tracking circuit 102 with the stored profiles for the predetermined amount of time of the employees cognitive state in the cognitive state database 130 to detect a deviation between the current cognitive state and the cognitive state profile so as to determine whether the employee may require a short break, a long-break, or the like. In other words, the deviation detection circuit 102 compares the characteristic parameters of each recently-completed window to a few windows prior.

The recommending circuit 104 sends a recommendation to the employee for the employee to take a break based on a size of the deviation between the cognitive state profile and the current cognitive state of the employee.

For example, for a within-work-day short break (e.g., to recommend a fifteen-minutes break), the deviation detecting circuit 103 compares small window cognitive state profiles (e.g., a size in the order of ten minutes) with windows that were anything between an hour to a few hours back (or from previous days), until the employee was seen to have taken a short break from work. If the last break was many windows back and if the deviation detecting circuit 103 detects a deviation greater than a threshold value between the current costive state and the cognitive state profile (e.g., a deviation in the eye gaze movement smoothness and/or facial/emotional ease), the recommending circuit 104 suggests that the employee to take a break.

Or, for a long-term break (e.g., to recommend a seven-day holiday from work), the deviation detecting circuit 103 compares large window cognitive state profiles (e.g., five-day windows) with other similar windows or other windows between a month or more to a year or more back, until the employee was seen to have taken a long break from work.

If the last break was a predetermined number of windows back and if the deviation detecting circuit 103 detects a deviation greater than a threshold value between the current cognitive state and the cognitive state profile, the recommending circuit 104 suggests the employee to take a holiday spanning for a few days, and notify the organization also.

It is noted that the last breaks or holiday windows are stored in the employee action database 150 (e.g., human resource department).

Figure 3:
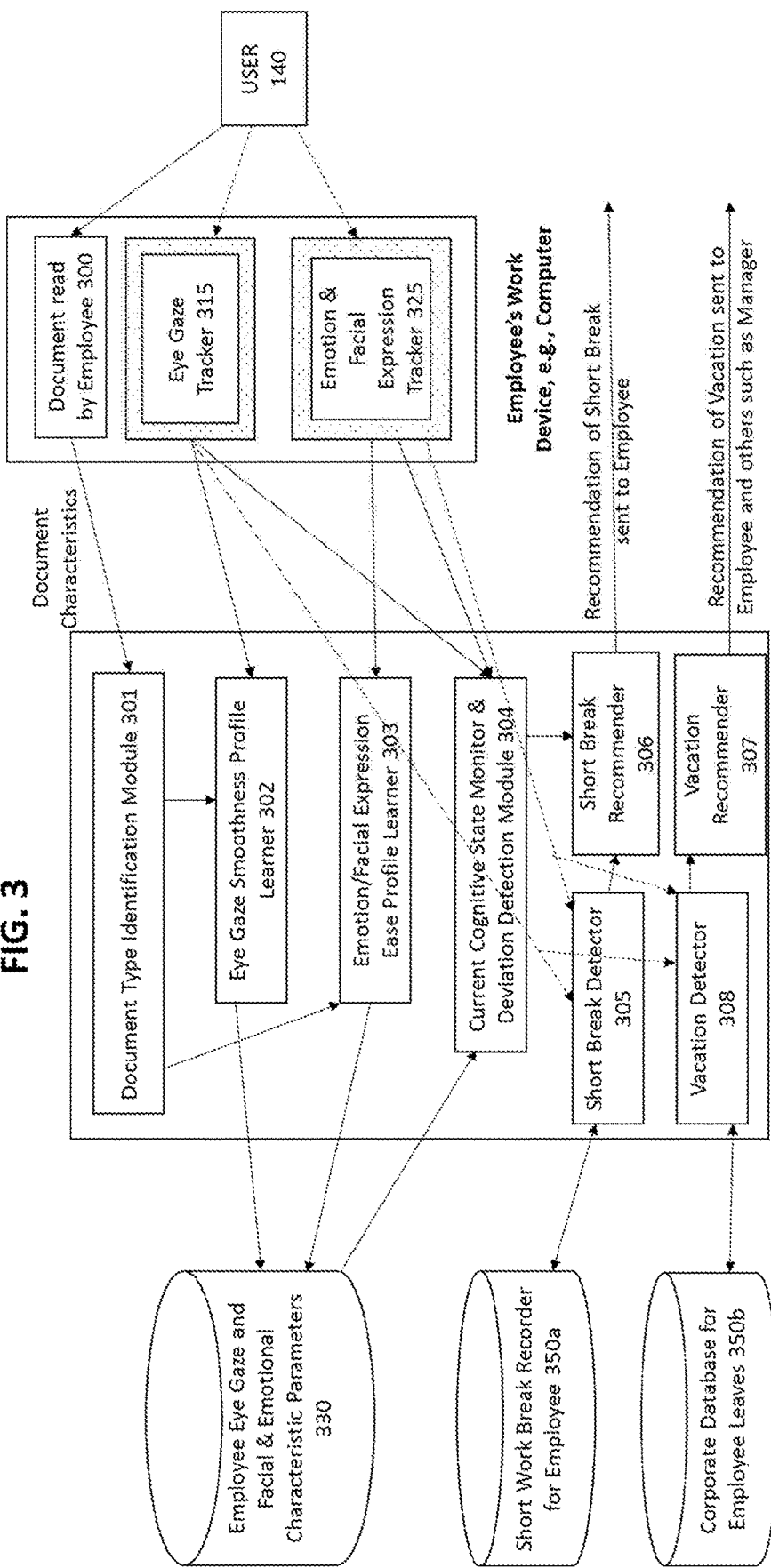
FIG. 3 exemplarily shows an exemplary flow of a recommendation to an employee as facilitated by the break recommendation system 100.

FIG. 3 shows an exemplary embodiment of the system 100 facilitating the recommending of a break to an employee based on the current cognitive state of the employee while working on a document as compared to the employee profile stored in the employee eye gaze and facial and emotional characteristic parameters 330 (i.e., the cognitive state database 130).

For example, the employee 140 can be viewing a document on their work station. The document type identification module 301 identified the document read by the employee 300 and identifies the difficulty of the document being worked on by the employee (e.g., the document identification and difficulty measuring circuit 101).

Further, the eye gaze tracker 315 and the emotion and facial expression tracker 325 track the current cognitive state of the employee (e.g., the cognitive state tracking circuit 102) and the eye gaze smoothness profile learner 302 and the emotion/facial expression ease profile learner 303 (e.g., the cognitive state tracking circuit 102) learns the typical cognitive state of the employee and stores the same.

For example, the employee profile can show that for a medium difficulty level document the employee usually has a "blank" expression indicating that the employee is focused while the employee's eyes track directly with the text of the document at a first cadence. Also, the employee profile can show that the employee typically experiences an exacerbated expression once a week when viewing this type document.

The current cognitive state monitor and deviation detection module 304 (e.g., the deviation detecting circuit 103) detects a deviation between the current cognitive state of the employee and the employee profile for both a short term and a long term window.

The short break detector 305 detects the last time that the employee took a short break as stored in the short work break recorder for employee 350a and the short break recommender 306 (e.g., the recommending circuit 104) recommends the employee take a short break when the current cognitive state of the employee deviates by a predetermined amount from the employee profile. For example, if the employee is reading a second cadence that is slower than the first cadence and the employee has not taken a break for a few hours, the short break recommender 306 will recommend that the employee take a break.

Or, the vacation detector 308 detects that the employee has not taken a vacation in several months and the vacation recommender 307 can make a recommendation that the employee take an extended vacation if, for example, the module 304 detects the employee is exhibited an exacerbated expression every few hours.

Thereby, the employee can return to viewing the document refreshed and the system 100 facilitates an efficient workforce optimization by using the current cognitive state of the employee when working on a document with a cognitive state profile of the employee.

Figure 2:
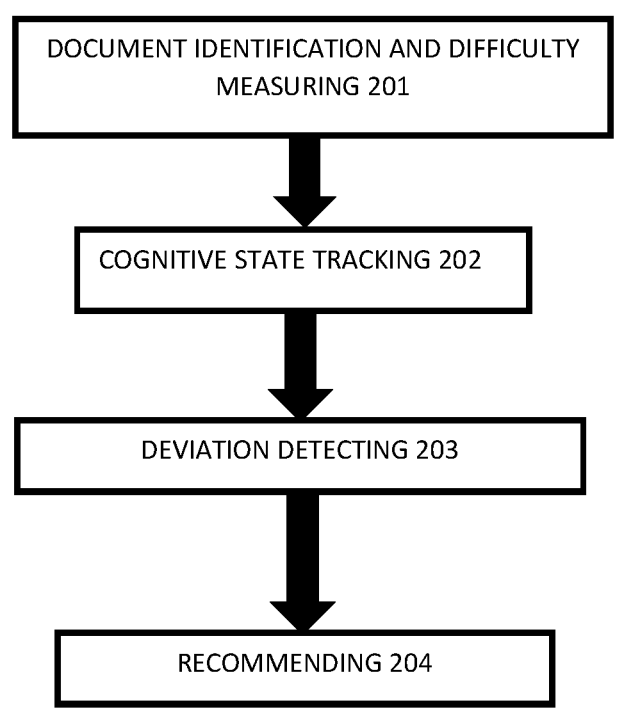
FIG. 2 exemplarily shows a high level low chart for a break recommendation method 200.

FIG. 2 shows a high level flow chart for a method 200 of break recommendation.

Step 201 identifies a document type (e.g., text document, software program written using a programming language, etc.) and for each page within the document, measures the objective difficulty of the page using, for example, Natural Language Processing (NLP) properties such as text readability, semantic difficulty, presence of sarcasm and so on. For other document types (e.g., non-textual such as software-based or programming), a difficulty level is set from either prior policies or external tools/techniques.

Step 202 tracks a cognitive state (e.g., based on eye gaze, facial, and/or emotional expressions) of the employee as the employee is working on the document.

Step 203 detects a deviation between a current cognitive state of the employee and a stored cognitive state profile of the employee over a short time window or a long time window. That is, Step 202 detects if the employee is not working efficiently and a break (or vacation) could cause the employee to be more efficient.

Step 204 recommends to the employee (or management) that the employee take a break (or vacation) if a deviation between the current cognitive state of the employee and the profile of the employee is greater than a predetermined threshold.

That is, the invention can monitor the employee's eye gaze movement and facial/emotional expressions over time, as they work with documents on digital devices in their workplace and learn their usual eye gaze smoothness and facial/emotional ease when they read text documents, and benchmark that with respect to the difficulty of text. This is bootstrapped over some period of time for different sliding window sizes (e.g., short such as ten-minute windows with a one-minute slide and long such as five-day windows with a one-day slide) to thereby create a profile for each employee for eye gaze smoothness and facial emotional ease with respect to document type and difficulty level.

Thus, during subsequent monitoring over a short-duration sliding window (e.g., a ten-minute window), when it is found that the employee's eye gaze smoothness and facial/emotional ease factors have fallen over the past short period (e.g., an hour or two), a short work-break (e.g., 15-30 minutes) is recommended. Or, for a long-duration sliding window (e.g., a five-day window), similarly, a long break (e.g., a seven-day vacation) is recommended.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide are, network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide prearrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the break recommendation system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A break recommendation system from viewing a document, comprising:
   a processor; and
   a memory, the memory storing instructions to cause the processor to perform:
      detecting, based on a change in an eye gaze movement and a facial and emotional expression, a deviation between a current cognitive state of a user and a past cognitive state of the user during a plurality of predetermined time frames that each have a set length of time for a document type; and
      recommending that the user takes a break from viewing the document for a predetermined amount of time based on the deviation being greater than a predetermined threshold value,
      wherein the past cognitive state of the user is categorized into a profile, a time window in the profile, and from an analysis of the user viewing a document having a same document difficulty as the document being currently viewed by the user during a same time length as the set length of time of the plurality of predetermined time frames.

2. The system of claim 1, wherein the memory further stores instructions to cause the processor to perform:
   measuring a document difficulty of the document,
   wherein the document difficulty for each portion of the document is measured.

3. The system of claim 1, wherein the deviation is stored in a user profile for the user.

4. The system of claim 1, wherein the detecting detects the deviation via gaze tracking of an eye gaze movement of the user.

5. The system of claim 1, wherein the past cognitive state of the user that is compared with the current cognitive state of the user is from at least two of the set length of time prior to a current time.

6. A non-transitory computer-readable recording medium recording a break recommendation program from viewing a document, the program causing a computer to perform:
   detecting, based on a change in an eye gaze movement and a facial and emotional expression, a deviation between a current cognitive state of a user and a past cognitive state of the user during a plurality of predetermined time frames that each have a set length of time for a document type; and
   recommending that the user takes a break from viewing the document for a predetermined amount of time based on the deviation being greater than a predetermined threshold value,
   wherein the past cognitive state of the user is categorized into a profile, a time window in the profile, and from an analysis of the user viewing a document having a same document difficulty as the document being currently viewed by the user during a same time length as the set length of time of the plurality of predetermined time frames.

7. A break recommendation method from viewing a document, comprising:

detecting, based on a change in an eye gaze movement and a facial and emotional expression, a deviation between a current a current cognitive state of a user and a past cognitive state of the user during a plurality of predetermined time frames that each have a set length of time for a document type; and recommending that the user takes a break from viewing the document for a predetermined amount of time based on the deviation being greater than a predetermined threshold value, wherein the past cognitive state of the user is categorized into a profile, a time window in the profile, and from an analysis of the user viewing a document having a same document difficulty as the document being currently viewed by the user during a same time length as the set length of time of the plurality of predetermined time frames.

* * * * *